(12) United States Patent
Gasparini et al.

(10) Patent No.: US 8,591,136 B2
(45) Date of Patent: Nov. 26, 2013

(54) NON-ROTATING UNIVERSAL JOINT FOR A HELICOPTER DRIVE UNIT

(75) Inventors: Giuseppe Gasparini, Gallarate (IT); Francesco Ferretti, Brebbia (IT); Massimo Forni, Ranco (IT); Roberto Regonini, Golasecca (IT)

(73) Assignee: Agusta S.p.A., Samarate (IT)

( * ) Notice: Subject to any disclaimer, the term of this patent is extended or adjusted under 35 U.S.C. 154(b) by 249 days.

(21) Appl. No.: 13/117,756

(22) Filed: May 27, 2011

(65) Prior Publication Data

US 2011/0293358 A1  Dec. 1, 2011

(30) Foreign Application Priority Data

May 27, 2010  (EP) .................................... 10425183

(51) Int. Cl.
*B64D 35/00* (2006.01)
(52) U.S. Cl.
USPC ............... 403/57; 403/158; 244/60; 464/125
(58) Field of Classification Search
USPC ......... 244/60; 464/125, 126; 403/53, 57, 150, 403/151, 154, 156, 157, 158
See application file for complete search history.

(56) References Cited

U.S. PATENT DOCUMENTS

| | | | | |
|---|---|---|---|---|
| 2,661,969 | A | * 12/1953 | Thiry | 403/228 |
| 2,917,123 | A | * 12/1959 | Ainsworth | 464/125 |
| 3,267,696 | A | * 8/1966 | Sieja | 464/132 |
| 4,365,488 | A | * 12/1982 | Mochida et al. | 403/57 |
| 5,154,382 | A | * 10/1992 | Hoshino | 403/157 |
| 6,324,744 | B1 | * 12/2001 | Banks et al. | 403/158 |
| 6,328,256 | B1 | * 12/2001 | Ryan et al. | 403/151 |
| 6,371,681 | B1 | * 4/2002 | Covington et al. | 403/158 |
| 6,672,787 | B2 | * 1/2004 | Tucker | 403/57 |
| 6,830,516 | B2 | * 12/2004 | McCormick et al. | 464/136 |
| 7,594,623 | B2 | * 9/2009 | Howard et al. | 244/54 |
| 8,002,489 | B2 | * 8/2011 | Mahy et al. | 403/158 |
| 2008/0116316 | A1 | 5/2008 | Manfredotti et al. | |

FOREIGN PATENT DOCUMENTS

| | | |
|---|---|---|
| CH | 212105 | 10/1940 |
| GB | 2159485 | 12/1985 |
| WO | 2004/026689 | 4/2004 |

OTHER PUBLICATIONS

European Search Report for EP 10 42 5183, dated Oct. 10, 2010 (2 pages).

* cited by examiner

*Primary Examiner* — Michael P Ferguson
(74) *Attorney, Agent, or Firm* — McCracken & Frank LLC

(57) ABSTRACT

A non-rotating universal joint for a helicopter drive unit has a spider defined by a ring, which has four connecting portions spaced 90° apart and engaging respective forks defining the ends of respective arms of two connecting members which, in use, are fixed with respect to a casing of an engine and a casing of a reduction gear; each fork and the corresponding connecting portion have respective through holes coaxial with one another and engaged by a screw; and dampers are interposed between the connecting portions of the ring and the shanks of the screws, and between the connecting portions of the ring and the forks.

5 Claims, 2 Drawing Sheets

NON-ROTATING UNIVERSAL JOINT FOR A HELICOPTER DRIVE UNIT

CROSS-REFERENCE TO RELATED APPLICATIONS

This application claims the benefit of European Patent Application No. 10 42 5183, filed May 27, 2010, which is incorporated by reference in its entirety herein.

The present invention relates to a non-rotating universal joint for connecting the casings of a helicopter engine and reduction gear.

BACKGROUND OF THE INVENTION

A universal joint of this sort is also known as a gimbal, and defines an isostatic constraint for the engine to compensate, on the one hand, for movements caused by thermal expansion, and, on the other, for relatively small movements transmitted to the engine by the reduction gear and caused by loads exerted on the reduction gear by the main rotor of the helicopter.

The spider of known non-rotating universal joints is defined by a ring with a space in the middle for a coaxial shaft, which rotates to transmit power from the engine to the reduction gear. The ring is connected to a first pair of diametrically opposite arms fixed with respect to the engine casing, and to a second pair of arms offset 90° with respect to the first pair and fixed with respect to the reduction gear casing.

The ring and the ends of the arms are connected by respective bolts extending radially with respect to the axis of the ring and the rotary transmission shaft, and each of which comprises a screw with a head resting on the outer surface of the relative arm; and a nut screwed to the end of the screw shank and resting on an inner surface of the ring.

The ring normally exerts shear stress on the bolts and bending stress on the arms, which are difficult to quantify. In the known solutions described, the shear stress on the screw shanks and the bending stress on the arms are relatively severe, on account of the screws projecting from the arms; and known solutions are subject to fretting, i.e. wear caused by the relatively moving contact surfaces rubbing against each other, particularly the surfaces of the screw shanks against the inner surfaces of the holes in the ring.

Wear and severe shear and bending stress result in failure of the screws and arms, so that the bolts and gimbal as a whole must be reinforced at the design stage, thus resulting in increased weight.

To minimize shear stress on the shank of each screw and bending stress on the arms without increasing weight, the arms may be designed with end forks engaged by respective portions, with holes, of the spider ring; and each of the four screws fits through the respective fork, i.e. is supported at two points spaced apart. By eliminating projection of the screws, this type of assembly reduces bending and, therefore, shear stress exerted by the ring on the screws. One solution of this type is described as known art in Patent EP1539573.

A need is felt to further improve the above known solutions, to reduce wear caused by fretting and shock, and to minimize the bulk thereof.

SUMMARY OF THE INVENTION

It is an object of the present invention to provide a non-rotating universal joint for a helicopter drive unit, designed to achieve the above in a straightforward, low-cost manner, and which is preferably easy to mount between the helicopter engine and reduction gear.

According to the present invention, there is provided a non-rotating universal joint for a helicopter drive unit, the non-rotating universal joint comprising:
  a spider defined by a ring, which extends about a longitudinal axis and comprises four connecting portions spaced 90° apart and having respective first through holes radial with respect to said longitudinal axis;
  two connecting members, which are fixed with respect to a casing of an engine and a casing of a reduction gear, and comprise respective pairs of arms; the arms of each connecting member being diametrically opposite each other, being offset 90° with respect to the arms of the other connecting member, and comprising respective forks; each of said forks comprising two opposite fingers defining between them a tangential slot engaged by a corresponding said connecting portion; and the fingers of each said fork having respective second through holes coaxial with the first hole in the corresponding connecting portion;
  four connecting bolt devices, each for fixing a respective said fork to the corresponding said connecting portion, and each comprising:
  a) a screw with a shank engaging said first and second holes;
  b) a nut screw screwed to a threaded end portion of said shank;
  the joint being characterized in that said connecting bolt devices comprise first damping means interposed between the shanks of the screws and the connecting portions of the ring.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
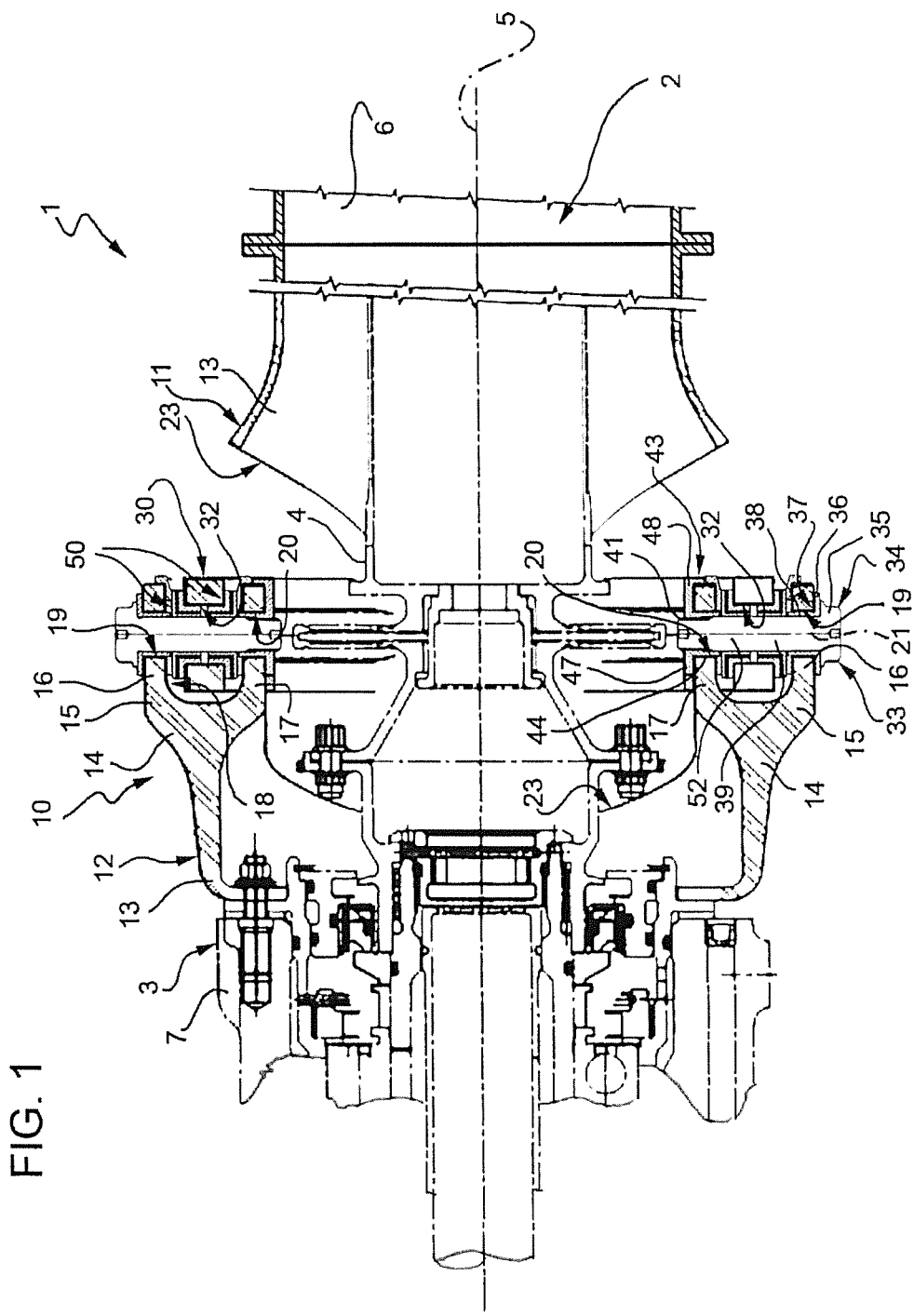
FIG. 1 shows a cross section of a non-rotating universal joint for a helicopter drive unit, in accordance with the present invention.

Number 1 in FIG. 1 indicates as a whole a helicopter drive unit comprising a turbine engine 2 and a reduction gear 3 (shown partly and schematically) connected by a rotary transmission shaft 4 extending along a longitudinal axis 5. Engine 2 and reduction gear 3 comprise respective casings 6 and 7 connected to each other by a non-rotating universal joint 10 also known as a gimbal.

Joint 10 is fitted through coaxially with shaft 4, and comprises two connecting members 11, 12 defined by additional bodies fixed to respective casings 6 and 7, or by portions forming part of respective casings 6 and 7.

Figure 2:
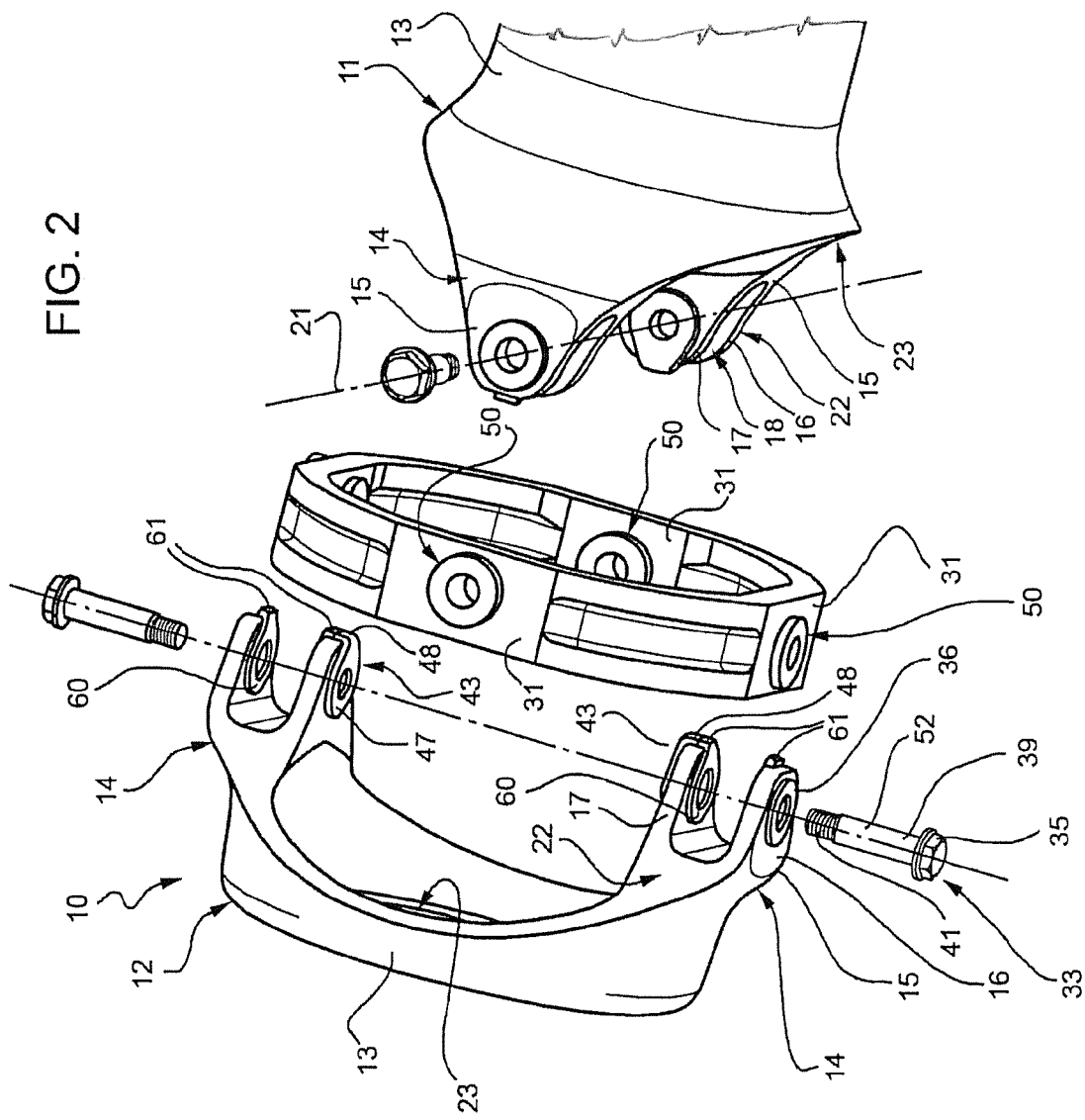
FIG. 2 shows an exploded view, with parts removed for clarity, of the non-rotating universal joint in FIG. 1.

With reference to FIGS. 1 and 2, member 12 comprises an annular portion 13; and two diametrically opposite arms 14 projecting, parallel to axis 5, from portion 13 and comprising respective end forks 15.

Each fork 15 comprises two fingers in the form of substantially flat, parallel plates 16 and 17 tangential to axis 5 and defining between them a slot 18 of substantially constant size.

Plate 16 is the outermost of the two with respect to axis 5. Plates 16, 17 of each fork 15 have respective circular holes 19, 20 equal in diameter and coaxial with each other along a radial axis 21 with respect to axis 5. Again with respect to axis 5, each fork 15 is bounded tangentially by a lateral surface 22 which blends smoothly with a concave front surface 23 of portion 13. In other words, the axial thickness of portion 13 increases gradually and circumferentially towards fork 15.

Member 11 is substantially identical to member 12, so its component parts are indicated using the same reference numbers.

Members 11 and 12 are connected by a spider defined by a ring 30 coaxial with shaft 4 and comprising four substantially flat portions 31, which are tangential to axis 5, are spaced 90° apart, engage slots 18, and have respective holes 32 coaxial with corresponding holes 19, 20. Each fork 15 is fixed to corresponding portion 31 by a connecting bolt device 33, which comprises a screw 34 with a head 35 which rests on the outside of plate 16 with the interposition of a washer 36. More specifically, washer 36 is defined by the annular flange of a bushing 37, which comprises a tubular portion 38 interposed between the shank 39 of screw 34 and the inner surface of hole 19. In addition to hole 19, shank 39 also fits through holes 32 and 20, and terminates with a threaded portion 41, most of which is housed inside hole 20, i.e. only a small portion of which projects from hole 20.

With reference to FIG. 1, each device 33 comprises a nut screw 43 with a special thread known by the trade name Spiralock® (registered trade mark). Any equivalent self-locking system may, however, be used instead of the Spiralock® thread.

Nut screw 43 is defined by a ring nut comprising an internally threaded tubular portion 44 screwed onto portion 41 and coaxially engaging hole 20. The ring nut also comprises an annular flange 47 perpendicular to axis 21, resting on plate 17, and having a tab 48 which is bent parallel to axis 21 to fit onto the edge of plate 17 to prevent rotation.

Figure 3:
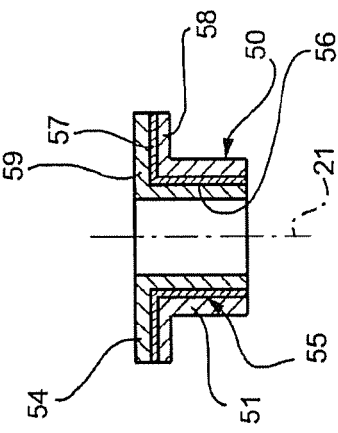
FIG. 3 shows an enlarged detail of the non-rotating universal joint in FIG. 1.

With reference to FIG. 3, each device 33 also comprises two bushings 50 identical in shape and size, and fitted coaxially and symmetrically to the inlet and outlet of hole 32, so that respective cylindrical portions 51 are interposed between the inner surface of hole 32 and an intermediate portion 52 of shank 39. The two bushings 50 comprise respective annular flanges 54, which are perpendicular to axis 21, are interposed between portion 31 and plates 16 and 17, and rest directly on portion 31. The two bushings 50 also comprise respective dampers 55, each defined by an intermediate layer of damping material, in particular elastomeric material such as cured rubber. Each damper 55 comprises a portion 56 extending along portion 51; and a portion 57 extending along flange 54. More specifically, damper 55 of each bushing 50 is sandwiched between two coaxial members 58, 59 made of rigid material, e.g. metal, and defining the cylindrical outer surfaces of portion 51, and the flat outer surfaces of flange 54.

With reference to FIG. 2, a spacer 60 is preferably interposed between each flange 54 and corresponding plate 16, 17. Spacers 60 have respective tabs 61 which are bent parallel to axis 21 to fit onto the edges of plates 16, 17 to prevent rotation.

The small movements transmitted by ring 30 to screws 34 when unit 1 is running produce relatively little shear stress, on account of each screw 34, as opposed to projecting, being supported by arm 14 at two points spaced apart and defined by plates 16, 17 of fork 15.

At the same time, dampers 55 form a cushion which ensures small relative tangential movements, with respect to axis 5, between the inner surfaces of holes 32 and the outer surfaces of shanks 39, and small relative radial movements, with respect to axis 5, between the flat surfaces of portions 31 and plates 16, 17. Because these small movements occur with no slide and are damped to prevent shock, wear is reduced in the areas where ring 30 is engaged by screws 34 and connected to arms 14.

The fact that bushings 50 are identical for both plate 16 and plate 17 reduces the component part listings for assembling joint 10, and therefore also cost. At the same time, using two flanges 54 with damping portions 57 for each portion 31 produces twice the damping action along axis 21. Moreover, because portions 51 engage holes 32, bushings 50 can be fitted to ring 30 before it is fitted to arms 14, thus simplifying assembly of joint 10.

Because head 35 and nut screw 43 rest, along axis 21, on members fixed with respect to each other (i.e. on plates 16, 17, ignoring washer 36), as opposed to members in relative motion, connection by screws 34 is firm and safe, even with relatively little torque on the screws; and the Spiralock® thread and washer 36 assist in preventing the screws from working loose.

Finally, the shape of members 11, 12 defines curved surfaces 23 blending with arms 14, so that members 11, 12 are less subject to failure.

Clearly, changes may be made to joint 10 as described and illustrated herein without, however, departing from the scope of the present invention as defined in the accompanying claims.

In particular, a damping system may also be provided in holes 19 and 20.

The invention claimed is:

1. A non-rotating universal joint for a helicopter drive unit, the non-rotating universal joint comprising:
   a spider defined by a ring, which extends about a longitudinal axis and comprises four connecting portions spaced 90° apart and each having a respective first through hole radially extending therethrough with respect to said longitudinal axis;
   two annular connecting members disposed on opposing sides of said ring about said longitudinal axis, each connecting member comprising respective pairs of arms;
   the arms of each connecting member diametrically opposing each other, being offset 90° with respect to the arms of the other connecting member, and comprising respective forks; each of said forks comprising two opposing axially extending fingers defining between them a tangential slot engaged by a corresponding said connecting portion; and the fingers of each said fork having respective aligned second through holes coaxial with the first hole in the corresponding connecting portion;
   four connecting bolt devices, each for fixing a respective said fork to the corresponding said connecting portion, and each comprising:
   a screw with a shank extending through a corresponding set of aligned said first and second holes;
   a nut screwed to a threaded end portion of said shank;
   a respective pair of annular bushings fitted to an inlet and outlet respectively of each said first hole; and
   a spacer interposed between each of said bushings and a corresponding said finger;
   wherein each said bushing comprises a first axially extending damping portion, defined by a layer of damping material, extending through a corresponding said first hole and interposed between said shank of said screw and said connecting portion of said ring, and a second radially extending damping portion, joined to said first damping portion and defined by a layer of damping material, interposed between said connecting portion of said ring and a respective said finger of a corresponding said fork;

wherein each said bushing comprises two rigid members coaxial with each other and fixed, on opposite sides, to said first and second damping portions;

wherein each said rigid member comprises an axially extending portion engaging a respective one of said shank of said screw and said connecting portion of said ring, and a second radially extending portion, joined to said first portion, engaging a respective one of said connecting portion of said ring and a corresponding said spacer.

2. A joint as claimed in claim 1, wherein said bushings of each respective of bushings are the same shape and size.

3. A joint as claimed in claim 1, wherein each said nut comprises an internally threaded tubular portion engaging a second hole in the corresponding said fork.

4. A joint as claimed in claim 3, wherein each said nut comprises an annular flange resting on a finger of the corresponding said fork.

5. A joint as claimed in claim 1, wherein the thread of each of said nuts comprises a self-locking thread.

* * * * *